Dec. 8, 1936. W. L. SMITH 2,063,764
COMBINATION FLIGHT INSTRUMENT
Filed April 13, 1932   2 Sheets-Sheet 1
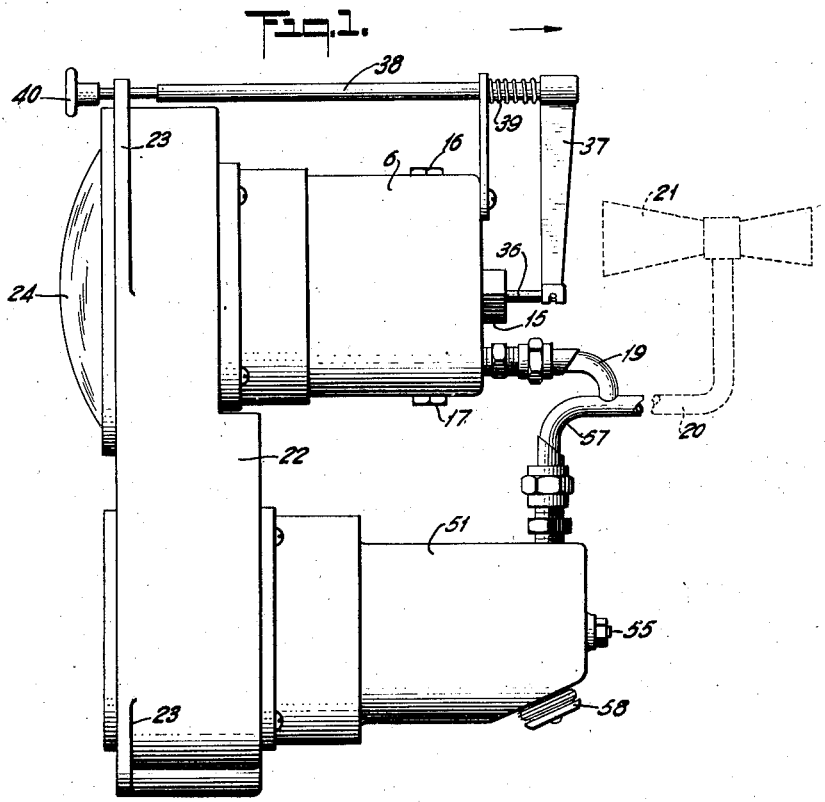
INVENTOR.
WESLEY L. SMITH.
BY Stephen Cerstvik.
ATTORNEY.

Dec. 8, 1936.                W. L. SMITH                2,063,764
                      COMBINATION FLIGHT INSTRUMENT
                  Filed April 13, 1932         2 Sheets-Sheet 2
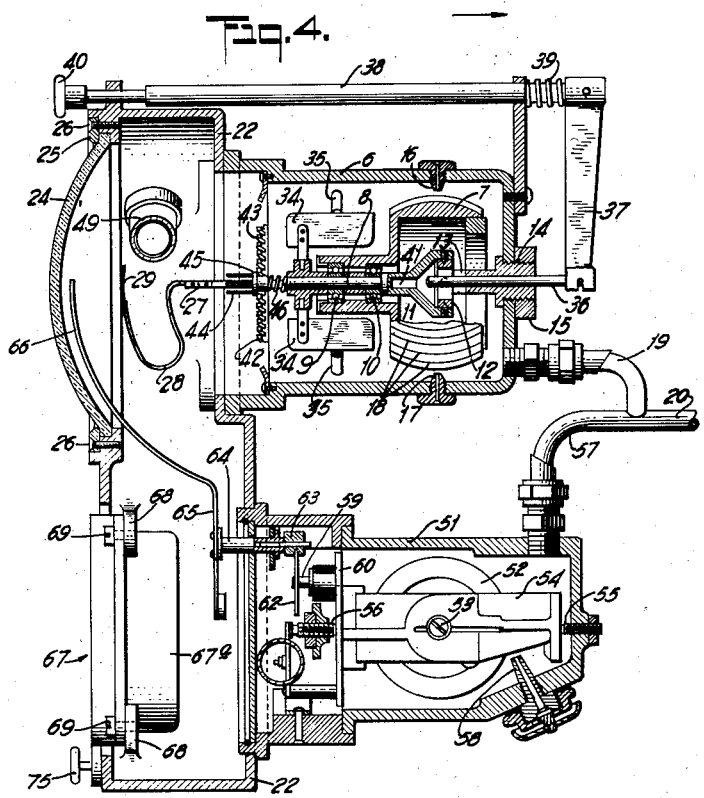
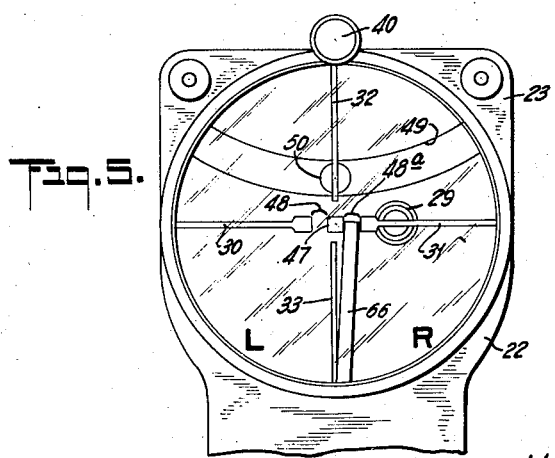
INVENTOR.
WESLEY L. SMITH.
BY Stephen Gerstvik.
                ATTORNEY.

Patented Dec. 8, 1936

2,063,764

UNITED STATES PATENT OFFICE 2,063,764

COMBINATION FLIGHT INSTRUMENT

Wesley L. Smith, Cranford, N. J., assignor, by mesne assignments, to Eclipse Aviation Corporation, East Orange, N. J., a corporation of New Jersey Application April 13, 1932, Serial No. 605,102

5 Claims. (Cl. 33—204)

The present invention relates to aircraft instruments and more particularly to a combined flight instrument for indicating the attitude of an aircraft in flight.

Heretofore various types of instruments have been provided for indicating, respectively, the rate of turn, the bank and the pitch of an aircraft, and certain other types have been provided for indicating two or more combinations of these indications, but none have been capable of producing all of said indications on a single dial and/or in a single field of view. Accordingly, one of the objects of the present invention is to provide a novel instrument whereby the rate of turn, the bank, the pitch, and the amount of turn of an aircraft may be indicated simultaneously on a single dial and/or in a common field of view so that a pilot need not observe more than one instrument to determine the attitude of his craft during flight.

Another object is to provide, in combination with a rate of turn indicator, novel means whereby the angular distance traversed by an aircraft while turning may be indicated.

Another object is to provide a novel combination flight instrument including means responsive to the rate of turn of a craft, means for indicating a predetermined and/or selected rate of turn, and means whereby the angular distance traversed by the craft at that rate is indicated.

A further object of the invention is to provide a novel flight instrument embodying means arranged to indicate a predetermined and/or selected rate of turn of a craft and means having a timed relation to said predetermined rate whereby the angular distance traversed by the craft at that rate is indicated.

Still another object is to provide for use in combination with a rate of turn indicator and arranged as a unit with the latter a novel timepiece or clock including cooperating means having a predetermined timed relation to a selected rate of turn indicated by the rate of turn indicator whereby the angular distance traversed by a craft turning at the selected rate is indicated by said timepiece.

The above and other objects and advantages of the invention will appear more fully hereinafter from a consideration of the detailed description which follows, taken together with the accompanying drawings wherein is illustrated one embodiment of the invention. It is to be expressly understood however that the drawings are not designed as a definition of the limits of the invention, reference being had primarily for this purpose to the appended claims.

In the drawings wherein like reference characters refer to like parts throughout the several views;

Fig. 1 is a side elevation of one form of the novel flight instrument embodying the present invention;

Fig. 2 is a front view of the upper portion of the instrument wherein are indicated the bank, the turn, the rate of turn, and the pitch of a craft;

Fig. 3 is a front view of the lower portion of the instrument and illustrates one form of novel means for indicating the amount of turn made while the craft is turning;

Fig. 4 is a sectional elevation of the instrument shown in Fig. 1; and

Fig. 5 is another front view of the upper portion of the instrument illustrating the manner of operation thereof.

Referring to the drawings and more particularly to the sectional view shown in Fig. 4, the instrument embodying the present invention comprises, in combination, a deviation indicator of the type disclosed in a copending application Serial No. 582,145, of Adolf Urfer, filed December 19, 1931, now Patent 2,011,738, granted Aug. 20, 1935 and a rate of turn indicator of the type disclosed in Patent No. 1,407,491, of Elmer A. Sperry, issued February 21, 1922. Combined with the deviometer or deviation indicator which indicates turns of the craft to the left and right, and pitch of the craft up or down is a ball-type gravity-actuated bank indicator which cooperates with the deviation indicator to indicate the bank of the craft. The rate of turn indicator is so constructed and arranged and so cooperates with the deviation indicator that its indications are produced on the same dial and/or in the same field of view as the indications produced by the deviation indicator and the bank indicator. Unitarily constructed and arranged with the deviation indicator and the rate of turn indicator is a novel time operated device or clock mechanism having means coordinated with a selected rate of turn, as indicated by the rate of turn indicator, whereby the amount of the turn at the selected rate is shown thereon.

In the form shown, the deviometer, or deviation indicator, comprises an air-tight casing 6 within which is mounted a gyro rotor 7 journaled on a non-rotatable horizontal shaft 8 in any suitable manner, as by means of ball bearings 9 and 10. Secured to or formed integral with the horizontal shaft 8 is a hollow conical extension 11 pivotally secured on a vertical axis to a gimble ring 12 which in turn is pivotally secured on a horizontal axis to a support 13 secured to the casing in any suitable manner as by means of a threaded portion 14 and a nut 15. The rotor 7 is arranged to be driven at relatively high speed by means of jets of air flowing from nozzles 16 and 17 which are arranged in diametrically opposed relation with respect to the rotor 7 and are carried by the casing 6 whereby air is introduced into the interior of the casing and directed on to the buckets 18 of the rotor 7 by exhausting the air from within the casing through a pipe 19 which is connected through a supply pipe 20 to a source of suction such as, for example, a Venturi tube 21 shown in dotted lines in Fig. 1. It will be apparent that the withdrawal of the air from the casing 6 by means of the Venturi tube 21 through the pipes 19 and 20 will cause jets of air to be directed by the nozzles 16 and 17 on to the buckets 18 of rotor 7, thereby rotating the latter. The center of gravity of the combined weight of the rotor, the non-rotatable horizontal shaft 8 and the bearings 9 and 10 is such that the entire structure is correctly balanced on its gimble supports 12 and 13, and due to the gyroscopic effect of the rotor 7, the shaft 8 will remain in a horizontal position at all times.

The casing 6 of the deviation indicator is secured to or formed integral with a large or master casing 22, which is adapted for mounting on an instrument panel by means of ears or lugs 23, and the upper portion of the front of said casing is provided with a cylindrical cover-glass 24 secured to the casing 22 in any suitable manner, as by means of a retaining ring 25 and screws 26.

Secured to or formed integral with the non-rotatable horizontal shaft 8 is an extension 27 carrying a U-shaped curved arm 28, to the free end of which is secured a disc shaped member 29 which constitutes the pointer of the deviation indicator and which cooperates with horizontal cross lines 30 and 31 and vertical cross lines 32 and 33 etched or placed on the cover-glass 24 in any other suitable manner, for indicating the up and down motion of the craft and the left and right movements thereof due to turning as will now appear. These movements of the disc member 29 are produced by relative movement between the casing 6 and the horizontal shaft 8 since the latter remains in a fixed horizontal position through a limited range of evolutions of the craft due to the gyroscopic action of the rotor 7. It will now be seen that if the casing 6 and its associated casing 22 are inclined upward due to an upward motion of the craft to which the casings are secured, the shaft 8 will remain stationary but its rotor end will have a relative movement downward, thereby causing the pointer end, and therefore the disc member 29, to move upward, thus indicating that the craft has inclined upward. In the same manner if the craft moves to the right, the rotor end of the shaft 8 will move to the left relative to its casing, thereby moving the pointer 29 to the right as viewed through the cover-glass 24.

Means are also provided for causing a return movement of the pointer 29 after an indication has been produced and in the form shown, and as fully described in the above mentioned Urfer Patent 2,011,738, said means comprising two pairs of plates secured to the shaft 8, one pair 34 being vertical as shown in Fig. 4, the other pair (not shown) being horizontal. Cooperating with the two pairs of plates are two pairs of nozzles, one pair of which is shown at 35 cooperating with the plates 34 and the other pair (not shown) cooperates with the horizontal pair of plates. The nozzles are so arranged with respect to the plates that upon an up or down movement of the shaft 8 with respect to the front of the casing the upper one of the pair of nozzles 35 will direct a stream of air against its cooperating plate and if the shaft moves downward with respect to the front of the casing 6 the lower one of the nozzles 35 will direct a stream of air against the lower plate of the vertical pair 34, thereby causing a precessional movement of the shaft 8 due to the gyroscope, thus producing a torque on the shaft which returns the shaft on a radially straight line to its normally straight position. On the other hand if the craft moves to the left or to the right one of the corresponding horizontal plates will move into the path of its cooperating jet, thereby, in the same manner, returning the shaft 8 to its normally central position.

Means are also provided whereby the pilot may, if he so desires, centralize the shaft 8 and hence the pointer 29, instantly and at will, and in the form shown said means comprise a plunger 36 which extends through the casing 7 through an opening provided in the supporting member 13 and is arranged to be moved longitudinally to the left by means of a connecting arm 37 adapted to be actuated by operating a pull-rod 38 rigidly connected to the lever 37 and operating against a coil spring 39, said push rod having a knob 40 projecting to the front of the casing 22 at the top thereof so that it may be readily manipulated when desired. The longitudinal movement of the rod 36 to the left by pulling the knob 40 causes said rod to be inserted into an opening 41 provided within the conical member 11 whereby the shaft 8 is caused to line up with the rod 36, thereby centralizing the pointer 29 with respect to its casing.

Means are also provided for preventing the pointer 28 from excessive fluctuation in the event that the shaft 8, and hence the extension 27, are caused to be moved to their extreme positions, thereby striking the casing and causing an impact which would produce such oscillations of the pointer. In the embodiment illustrated, said means comprise a series of racks 42, arranged around the front of the casing to form a square and having serrations or teeth 43 which are adapted to engage pins 44 secured to or formed integral with a collar 45 loosely mounted on the extension 27 of the shaft 8 but connected to the latter by means of a torsional spring 46 which takes up the impact produced by the striking of one of the pins 44 against one of the racks 42. The serrations or teeth 43 are inclined in a direction opposite to the direction of rotation of the rotor 7 so that they may readily engage the pins 44, but due to the torsional action of the spring 46 on the sleeve 45 the pins 44 will be withdrawn from the teeth 43 and the pointer will return to its normally central position by the action of the air stream directed by jets 35 onto the plates 34. When the pointer 29 is in the exact center with respect to its casing it coincides with the center of an index 47 which is in the form of a square and which is centrally located within the space formed by the extremities of the cross lines 30, 31 and 32, 33, and spaced from said extremities at predetermined distances indicated at 48 and 48a. The purpose and function of the selected or predetermined spaces 48 and 48a will appear more fully hereinafter in connection with the novel means for indicating a predetermined rate of turning whereby the amount of turn of the craft at that rate can be determined.

Positioned within and secured to the inner wall of the casing 22 and in front of the casing 6 is a ball-type bank indicator which is constituted by a curved glass tube 49 having a circular cross section within which is placed a metal ball 50 of such diameter that it just clears the inner walls of the tube 49, said tube 49 being mounted transversely of the casing 22 and so that it may be viewed through the cover-glass 24. Usually the tube 49 is filled with suitable liquid for damping the movements of the ball 50 therewithin. The function and operation of the bank indicator are well known to those skilled in the art and all that need be said is that when the craft banks to the left or right without turning, the ball 50 will move to the left or right of the vertical cross line 32 and when the craft is banked while turning and is banked at the correct angle for the particular rate of the turn, the ball 50 will remain in the center due to the centrifugal force acting thereon. The member 28 is curved and U-shaped in order that the disc member 29 may be moved upward beyond the glass tube 49 without the member 28 striking the latter.

The turn indicator, as pointed out above, is of the type described in Patent No. 1,407,491 of Elmer A. Sperry and comprises an air-tight casing 51 which is also secured to or formed integral with the casing 22, and has mounted therein a gyro rotor 52 journaled on a transverse horizontal axis 53 in a precessional frame 54 which in turn is pivoted on a longitudinal horizontal axis formed by a pair of pivots 55 and 56 secured to the casing 51. The rotor 52 is also driven by withdrawing the air from the casing through a pipe 57 connected to the suction supply pipe 20. The withdrawal of the air from the casing causes a stream of said air to be directed onto the rotor 52 by means of a nozzle 58 which communicates with the atmosphere exterior of the casing. The direction of rotation of the rotor is such that upon turning of the craft to the left or to the right the frame 54 will precess about its pivots 55, 56 in the opposite direction, the precessional movements of the frame being a direct function of the rate of turning of the craft about an axis perpendicular to the axis 53 and the axis formed by the pivots 55, 56. Means are now provided for utilizing these precessional movements of the frame 54 to produce indications of the rate of turning of a craft on which the device is mounted, with the axes 55, 56 coinciding with or parallel to the longitudinal axis of the craft. In the form shown said means comprise a pin 59 secured to a circular plate 60 carried by the precessional frame 54, the pin being on a vertical radius in its normal position so that it may move clockwise or counter-clockwise when the frame precesses, and engages a pair of pins, one of which is shown at 62, said pins being parallel and on opposite sides of the pin 59 and secured to a member 63 carried by a rock shaft 64 to which is secured a pointer 65, the latter having an upwardly extending curved portion 66 which projects into the upper portion of the casing 22 so as to be visible through the cover-glass 24, that is, in the same field of view with the pointer 29 and the ball 50. The precessional frame 54 is centralized by means of a spring (not shown) having one end thereof secured to the plate 60 and the other end to the casing 51 in such a manner that upon rocking movement of the precessional frame in either direction said spring will return it to its normal and central position, as is understood by those skilled in the art to which the device pertains, and therefore a separate view of said spring has not been shown. The connection between the pin 59 and the rock shaft 64 is such that the pointer 66 will move in a direction opposite to the movements of the precessional frame 54 but since the latter movements are opposite to the direction of turning of the craft the movements of the pointer 66 will be in the same direction as the direction of turning of the craft and, as has already been stated, the movements will be proportional to the rate of such turning.

The width of the pointer 66, as viewed from the front of the instrument, is equal to the width of the spaces 48 and 48a, respectively, and of the index 47 so that it may be readily noted when said pointer exactly coincides with or falls within either of the spaces 48 and 48a when the craft is turning to the left or to the right respectively. Further, the turn indicator is so calibrated that when the pointer 66 coincides with either of the spaces 48 and 48a the craft is turning exactly at the rate of 3° per second which is the usual and normal rate at which a pilot maneuvers his craft in a turn. It is obvious, however, that the spaces 48 and 48a could be located further to the left or to the right of the index 47 along the horizontal cross lines 30 and 31, if so desired, so as to indicate any other selected rate of turn, it being further apparent that the rate of turn is greater as the pointer 66 moves further to the left or to the right.

It is desirable that a pilot know not only the rate at which he is turning but the angular distance which he has traversed during such a turn and for this purpose novel means are provided whereby, when the craft is turning at a certain rate, as for example at 3° per second, as indicated by the rate of turn indicator, the number of degrees of such turn at that rate or any other predetermined rate will be indicated.

In the form shown in Figs. 3 and 4 such means comprise a standard clock 67 having the usual spring-operated mechanism (not shown) enclosed in and carried by a casing 67a which in turn is mounted within the casing 22 in any suitable manner, as by means of lugs 68 and screws 69, and positioned in said casing 22 below the cover-glass 24 and in front of the turn indicator 51 in such a manner that the face of the clock may be viewed simultaneously with the indications produced by the deviation indicator and the turn indicator which are visible through the cover-glass 24. The clock is provided with the usual hour hand 70 and a minute hand 71 cooperating with a standard time scale 72 to indicate the time in hours and minutes. There is provided however, for the purpose of indicating the angular distance traversed by the craft while making a turn at a predetermined or selected rate, an additional pointer 73 cooperating with the scale 72, but the latter is provided with additional indications 74 marked in terms of degrees from 0 to 360, the hour divisions from 1 to 12 corresponding to 30° and the minute divisions each corresponding to 6°. The pointer 73 of the clock is geared to the clock mechanism in such a manner that it makes, in the present instance, one complete revolution in two minutes, that is it rotates over the face of the clock at the rate of 3° per second corresponding to the predetermined or selected rate of turn as indicated when the pointer 66 of the turn indicator coincides with either the space 48 or the space 48a. The clock is provided with a knob 75 for winding it in the usual manner.

It will now be apparent that if the craft on which the novel combined flight instrument is mounted starts to turn at the rate of 3° per second, as indicated by the rate of turn pointer 66, when the pointer 73 is at zero degrees on the scale 74 of the clock, said pointer 73 will then indicate on said scale the angular distance that is being traversed while the craft is turning at the predetermined or selected rate of 3° per second, and will also indicate the number of degrees that has been traversed by the craft after it has ceased turning.

There is thus provided a novel flight indicator which indicates simultaneously on one dial and/or in a single field of view the bank, the pitch, the turn, and the rate of turn of a craft, and which also indicates the angular distance the craft has traversed during a turn, thereby enabling the pilot to determine at a glance all of the motions of his craft constituting a particular maneuver which he is making so that he may control his craft accordingly.

Although only one embodiment of the invention has been illustrated and described, various changes and modifications, which will now be apparent to those skilled in the art to which the invention appertains, may be made without departing from the scope of the invention. For example, as hereinbefore stated, different calibrations may be provided in the horizontal lines 30, 31 of the cover-glass 24 to give indications of one or more other and different rates of turn, and the novel timing means or clock may be provided with one or more auxiliary pointers traversing the dial thereof at various rates, corresponding to the rates marked on the coverglass and indicated by the turn indicator and arranged in different colors, each color representing a predetermined and/or selected rate. Reference is, therefore, to be had primarily to the appended claims for a definition of the limits of the invention.

What is claimed is:

1. An aircraft combination flight instrument comprising a casing having means for mounting it on an instrument panel and having an upper section and a lower section, said sections forming upper and lower compartments, respectively, which join in a common compartment at the front of the casing, a gyroscopic device in one of said compartments responsive to deviations of a craft about its vertical and transverse horizontal axes and having a pointer projecting into the common compartment, another gyroscopic device in the second compartment responsive to the rate of turn of the craft about its vertical axis and having a pointer projecting into the common compartment and extending towards the first pointer so that the two pointers are in substantial coincidence when the aircraft is moving in straight line flight, reference means cooperating with the two pointers and including a reference index with which the pointer of the rate of turn responsive device coincides when the craft is turning at a predetermined rate about its vertical axis, timing means in a portion of the common compartment adjacent the two pointers and having an indicating element moving at the same rate of turn as the predetermined rate of turn of the craft, and means over which said indicating element moves to indicate the angular distance traversed in azimuth by the craft during such turn at the predetermined rate.

2. An aircraft combination flight instrument comprising a casing having means for mounting it on an instrument panel and having an upper section and a lower section, said sections forming upper and lower compartments, respectively, which join in a common compartment at the front of the casing, a gyroscopic device in the upper compartment responsive to deviations of a craft about its vertical and transverse horizontal axes and having a pointer projecting into the common compartment at the upper part thereof, another gyroscopic device in the lower compartment responsive to the rate of turn of the craft about its vertical axis and having a pointer projecting into the common compartment and extending upward towards the first pointer so that the two pointers are in substantial coincidence when the aircraft is moving in straight line flight, reference means cooperating with the two pointers and including a reference index with which the pointer of the rate of turn responsive device coincides when the craft is turning at a predetermined rate about its vertical axis, timing means in the lower portion of the common compartment and having an indicating element moving at the same rate of turn as the predetermined rate of turn of the craft, and means over which said indicating element is moved to indicate the angular distance traversed in azimuth by the craft during such turn at the predetermined rate.

3. An aircraft combination flight instrument comprising a casing, a gyroscopic device in said casing responsive to deviations of a craft about its vertical and transverse horizontal axes and having a pointer operated thereby visible from one end of the casing, another gyroscopic device in said casing adjacent said first gyroscopic device and responsive to the rate of turn of the craft about its vertical axis and having a pointer extending towards the first pointer so as to be in substantial coincidence therewith when the craft is moving in straight-line flight, reference means cooperating with the two pointers and including a reference index with which the second pointer coincides when the craft is turning at a predetermined rate about its vertical axis, timing means in said casing adjacent said first two pointers and having an indicating element moving at the same rate as the predetermined rate of turn of the craft, and means over which said indicating element is moved to indicate the angular distance traversed by the craft in azimuth during such turn at the predetermined rate.

4. An aircraft combination flight instrument comprising a casing, a gyroscopic device in said casing responsive to deviations of a craft about its vertical and transverse horizontal axes and having a pointer operated thereby visible from one end of the casing, another gyroscopic device in said casing adjacent said first gyroscopic device and responsive to the rate of turn of the craft about its vertical axis and having a pointer extending towards the first pointer so as to be in substantial coincidence therewith when the craft is moving in straight-line flight, reference means cooperating with the two pointers and including a reference index with which the second pointer coincides when the craft is turning at a predetermined rate about its vertical axis, a clock in said casing adjacent said first two pointers and located in front of the gyroscopic device the pointer of which extends towards the pointer of the other gyroscopic device, said clock having an hour hand, a minute hand, an auxiliary hand and a dial marked in hours and in degrees, said minute hand and hour hand moving over the said dial to indicate time, and said auxiliary hand being operated by the clock mechanism to move over said dial at the same rate as the predetermined rate of turn of the craft about its vertical axis for indicating on the dial the angular distance traversed by the craft in azimuth during such turn at the predetermined rate.

5. An aircraft combination flight instrument comprising a casing, a gyroscopic device in said casing responsive to deviations of a craft about its vertical and transverse horizontal axes and having a pointer operated thereby visible from one end of the casing, another gyroscopic device in said casing adjacent said first gyroscopic device and responsive to the rate of turn of the craft about its vertical axis and having a pointer extending towards the first pointer so as to be in substantial coincidence therewith when the craft is moving in straight-line flight, and reference means cooperating with the two pointers including a reference index with which the second pointer coincides when the craft is turning at a predetermined rate about its vertical axis.

WESLEY L. SMITH.